United States Patent [19]

Mächler et al.

[11] Patent Number: 4,644,632
[45] Date of Patent: Feb. 24, 1987

[54] METHOD OF ASSEMBLING THE OPTICAL COMPONENTS OF AN OPTICAL APPARATUS AND A DEVICE THEREFOR

[75] Inventors: Meinrad Mächler, Ellwangen; Reinhold Bittner, Mögglingen; Franz Glück; Harry Schlemmer, both of Aalen; Richard Sachse, Königsbronn, all of Fed. Rep. of Germany

[73] Assignee: Carl-Zeiss-Stiftung, Heidenheim, Fed. Rep. of Germany

[21] Appl. No.: 839,339

[22] Filed: Mar. 13, 1986

[30] Foreign Application Priority Data

Mar. 14, 1985 [DE] Fed. Rep. of Germany ....... 3509131

[51] Int. Cl.<sup>4</sup> ............ B23P 21/00; B32B 31/00; G02B 1/00; G01J 3/28
[52] U.S. Cl. .................................... 29/469; 156/293; 350/590; 356/328
[58] Field of Search ............. 350/590; 156/556, 293, 156/102, 559; 356/326, 328; 29/469, 464, 423

[56] References Cited

U.S. PATENT DOCUMENTS

| 2,535,289 | 4/1953 | Owens | 156/102 |
|---|---|---|---|
| 3,184,359 | 5/1965 | Lissac | 156/556 |
| 4,259,014 | 3/1981 | Talmi | 356/328 |
| 4,268,170 | 5/1981 | Flint | 356/328 |
| 4,277,141 | 7/1981 | Klieber | 156/559 |
| 4,364,634 | 12/1982 | Bjorlund | 350/590 |
| 4,494,872 | 1/1985 | Busch | 356/328 |
| 4,496,416 | 1/1985 | Machler et al. | 156/293 |
| 4,540,282 | 9/1985 | Landa et al. | 356/328 |
| 4,567,187 | 2/1986 | Kita et al. | 356/328 |

Primary Examiner—Howard N. Goldberg
Assistant Examiner—Steven Nichols
Attorney, Agent, or Firm—Walter Ottesen

[57] ABSTRACT

For mounting the optical components of optical apparatus in an adjusted manner, the optical components are either adjusted and permanently fixed in or on shaped component bodies having accurately defined dimensions, or are produced on such bodies at an accurate location and with accurate alignment. Then, the shaped component bodies are assembled in a defined manner, so that the optical components assume the precisely correct location relative to one another.

16 Claims, 9 Drawing Figures

METHOD OF ASSEMBLING THE OPTICAL COMPONENTS OF AN OPTICAL APPARATUS AND A DEVICE THEREFOR

FIELD OF THE INVENTION

The invention relates to a method for the adjusted assembly of the optical components of an optical apparatus. The invention also relates to an optical apparatus for performing the method.

BACKGROUND OF THE INVENTION

Optical apparatus comprise a plurality of optical components, which must be adjusted accurately relative to one another or to a chassis, so that the apparatus will have the desired properties. The optical components, such as the slit, grating and receiver of a spectrometer, are therefore typically disposed on an apparatus chassis or similar device by means of adjustable holders. Depending on the number of degrees of freedom required for adjustment, these holders are rather complicated in structure and therefore expensive. They also occupy space.

From published German patent application DE-OS No. 32 11 867, U.S. Pat. No. 4,496,416, it is known, in adjusting and mounting an optical component in an optical apparatus, to hold the optical component using an adjusting device that is not part of the apparatus and to adjust it using this device, and to join it to the apparatus after the adjustment operation by using a liquid or pasty substance which sets with only a slight change in volume, and later to remove the adjusting device. In this way, a space-saving configuration of the optical apparatus is achieved, and the holding means of the optical components is very simple and hence economical.

One disadvantage of this method is that the adjusting devices take up space during the mounting and adjusting operation, and so in optical apparatus that have a very small volume, these devices can be used only with considerable difficulty, if at all. Recently, however, spectrometers having a volume on the order of milliliters or less have gained increasing significance. In other optical apparatus, too, there has been a trend toward miniaturization for some time. This applies particularly to multiplexers and demultiplexers for fiber-optic communications.

SUMMARY OF THE INVENTION

It is an object of the invention to provide a method with which the components of an optical apparatus that has a volume on the order of milliliters or less can be adjusted and mounted, or mounted and adjusted. It is also an object of the invention to provide an optical apparatus for performing the method.

This object is attained in accordance with the invention by providing that the optical components are either adjusted and permanently fixed in or on shaped component bodies, or are manufactured such that they are accurately located and aligned, and then the shaped component bodies are assembled and fixed in a defined manner.

The method of the invention for assembling the optical components of an optical apparatus includes the steps of: placing the optical components on selected ones of a plurality of shaped component bodies each having predetermined contact engaging faces so as to cause the optical component on a shaped component body to be precisely located and aligned with respect to the faces thereof; then assembling the shaped component bodies so as to cause selected pairs of the contact engaging faces to be in mutual engaging contact thereby establishing a predefined assembled arrangement of the shaped component bodies; and, fixing the shaped component bodies so as to retain the same in the predefined assembled arrangement.

In contrast to the known prior art, the optical apparatus is accordingly assembled from individual parts, here called shaped bodies, which are manufactured with such accuracy at the contacting surfaces that are critical for the assembly operation that they fit together positively, without play. These shaped bodies contain the optical components with the required accurate location and alignment with respect to the contacting surfaces critical to assembly.

In an advantageous embodiment of the invention, the shaped component bodies are joined together by means of one or more shaped spacer bodies.

In another advantageous embodiment of the invention, the shaped component bodies are inserted into a hollow shaped body. In one embodiment, the shaped component bodies are brought into the exactly correct location with respect to one another inside the hollow shaped body by means of one or more shaped spacer bodies. In another embodiment, the shaped spacer bodies are closed off with a bottom plate and a cover plate, which with the hollow shaped body receive the shaped component bodies in the exactly correct location relative to one another. In a further, particularly advantageous embodiment, the shaped component bodies are put into the exactly correct location relative to one another inside the hollow shaped body by means of shaped adjusting bodies. The shaped adjusting bodies are removed once the shaped component bodies are fixed on the hollow shaped body.

For accurate adjustment of the optical components on or in the shaped component bodies with respect to the contacting surfaces that are critical for assembly, a measuring microscope is generally an adequate tool. For a concave grating, however, this method is not adequate for a variety of applications. In an advantageous embodiment of the invention, accordingly, a holographic grating is produced directly on the shaped component body, which is disposed with respect to the entry slit and the plane of the receiver under conditions functionally identical to those occurring during subsequent use, with the location of the entry slit or a location conjugate to it and a suitable point in the plane of the receiver being used as source points for producing the grating. For an optimal correction, one of the source points may also be located a slight distance away from the location of the entry slit.

It is also possible, for example, to produce the entry slit or light-conducting fiber connections directly in a shaped component body.

The invention is suitable for a wide range of optical apparatus.

BRIEF DESCRIPTION OF THE DRAWING

The invention will now be described with reference to the drawing, all showing exemplary embodiments on an enlarged scale, wherein:

FIG. 3b is a section view taken along line IIIb—IIIb of the embodiment of FIG. 3a;

FIG. 4b is a section view taken along line IVb—IVb of the embodiment of FIG. 4a;

DESCRIPTION OF THE PREFERRED EMBODIMENTS OF THE INVENTION

Figure 1:
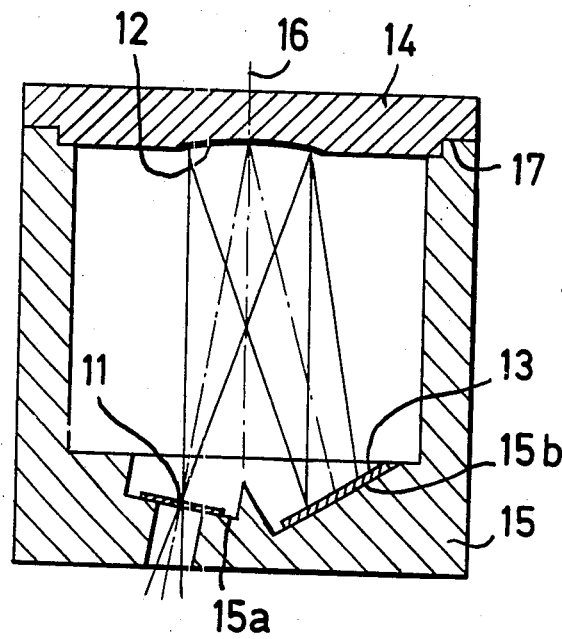
FIG. 1 shows a first exemplary embodiment for a spectrometer.

FIG. 1 shows an entry slit 11, a concave grating 12 and a diode cell 13. These three optical components embody a known spectrometer arrangement, the so-called Rowland arrangement. The three optical components are seated in two housing parts 14 and 15, which will be called shaped component bodies herein, and which in a preferred embodiment are cylindrical parts having a common axis 16. The surfaces 15a and 15b for the slit 11 and the receiver 13 can be produced, in turned parts, with an end-milling cutter. However, like all the other elements called shaped bodies herein, these shaped bodies can also be produced in the form of injection-molded or high-pressure die-cast parts from suitable materials, such as plastic or metal, or also glass or ceramic, in particular high-density ceramic.

Because of the step 17, the shaped component bodies 14 and 15 can be assembled in exact alignment, and they can also be secured against twisting about the axis 16 in a known manner. The adjustment and permanent fixation of the optical components, or their production with accurate location and alignment, in or on the shaped component bodies will be described hereinafter.

Figure 2:
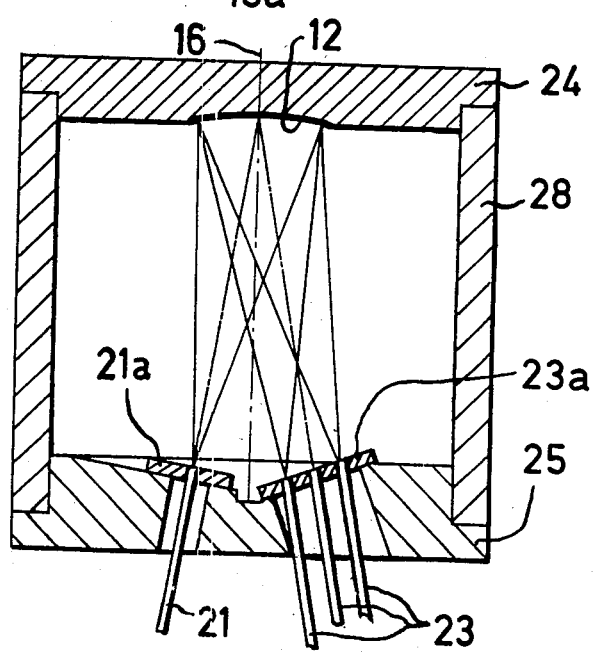
FIG. 2 shows an exemplary embodiment for a multiplexer/demultiplexer.

FIG. 2 shows a somewhat modified embodiment of the configuration comprising shaped bodies in which the slit is also replaced by an entry light-conducting fiber 21 and the receiver is replaced by a plurality of exit light-conducting fibers 23, as is known in multiplexers and demultiplexers intended for fiber-optic communications. The optical components 21, 12 and 23 are seated here in two shaped component bodies 24 and 25, which are joined by the shaped spacer body 28. The three shaped bodies 24, 25, 28 have a common axis 16 and can likewise be economically manufactured, with high accuracy, in the form of turned parts. As compared with the embodiment shown in FIG. 1, the shaped component body 25 here is flat, and therefore has advantages in terms of the adjustment and fixation, or production, of the optical components.

Figure 3A:
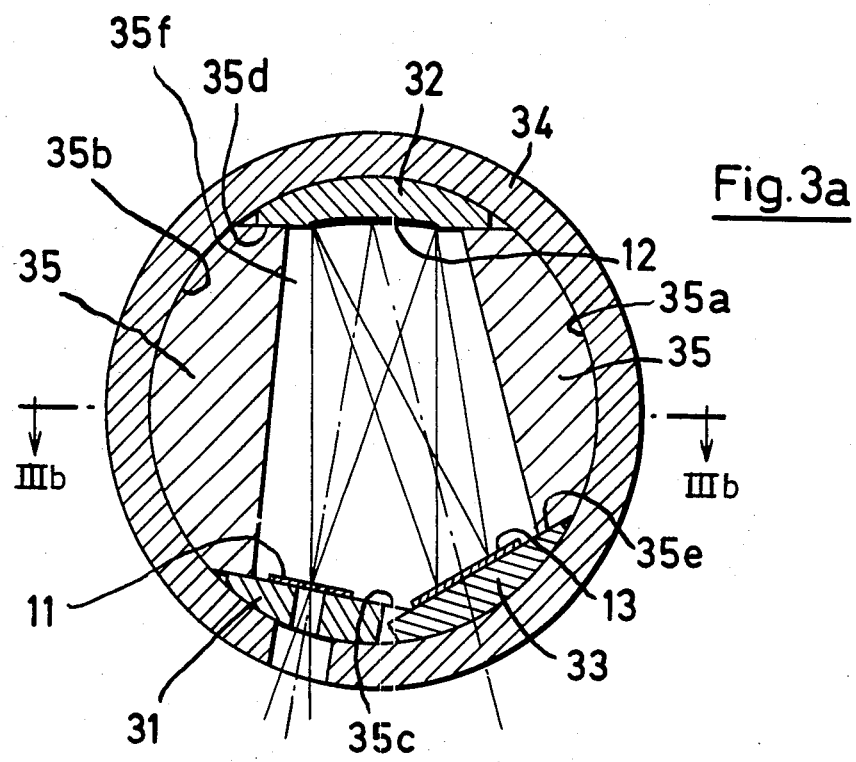
FIG. 3a is a section view taken along line IIIa—IIIa of FIG. 3b and shows a second exemplary embodiment for a spectrometer.
Figure 3B:
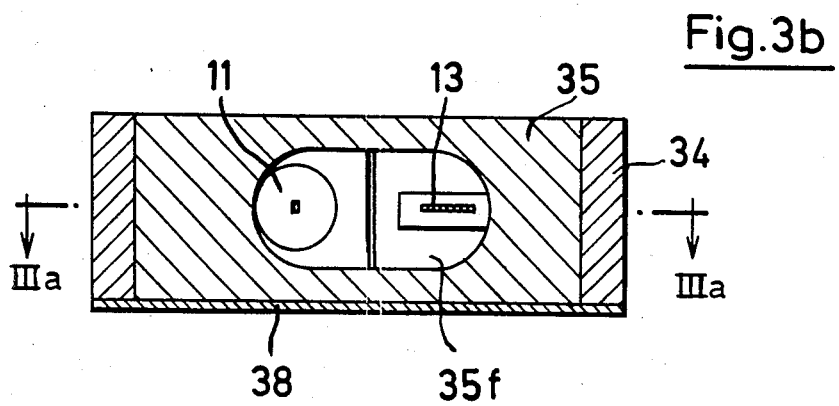

In FIG. 3, a further embodiment is shown. Here the optical components 11, 12 and 13 are seated on shaped component bodies 31, 32 and 33 in the form of segments of cylinders, which are arranged in the cylindrical hollow shaped body 34. Together with the shaped spacer body 35, they fill the shaped hollow body 34 in such a way that the shaped component bodies 31, 32 and 33 can assume only accurately defined locations. To this end, the shaped spacer body 35, on its outer circumference, comprises the cylindrical surfaces 35a and 35b and the segmental surfaces 35c, 35d and 35e. The shaped spacer body 35 has a sufficiently large internal recess 35f for the beam path of the spectrometer. All the shaped bodies are seated on the base plate 38, which is shown in the sectional view of FIG. 3b, so that the shaped component bodies 31, 32 and 33 also assume the exactly correct height relative to one another.

Figure 4A:
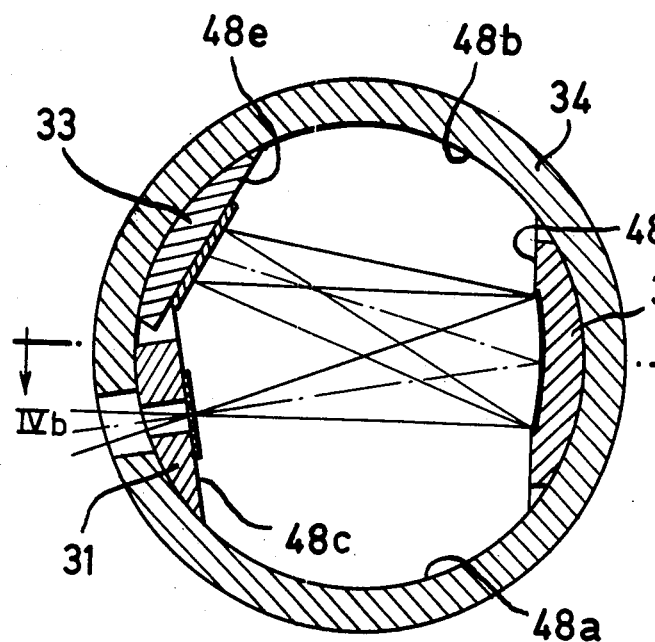
FIG. 4a is a section view taken along line IVa—IVa of FIG. 4b and shows a third exemplary embodiment for a spectrometer.
Figure 4B:
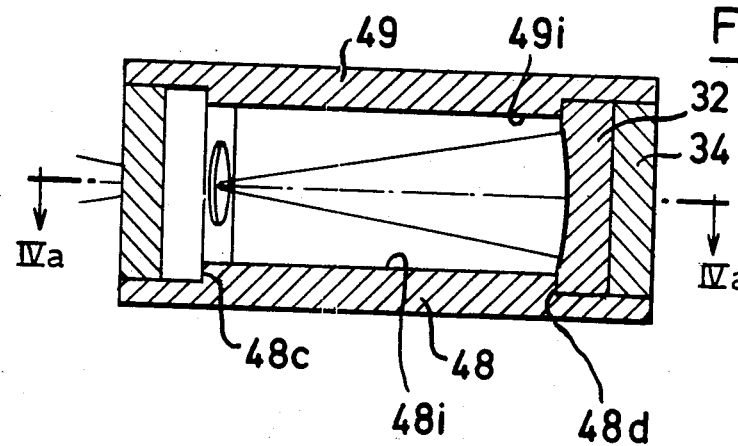

In FIG. 4, a similar embodiment is shown, but in which the shaped spacer body 35 of FIG. 3 is unnecessary, because the bottom plate 48 and a cover plate 49 also perform its function. To this end, the plates 48 and 49 each have on their inwardly facing sides, 48i and 49i respectively, a stepped portion, which is defined by the cylindrical surfaces 48a and 48b and by the segmental surfaces 48c, 48d and 48e. During assembly, first the shaped hollow body 34 is placed upon the bottom plate 48; then the shaped component bodies 31, 32 and 33 are inserted, and finally the cover plate 49 is put in place. The bottom plate 48 and the cover plate 49 can be pressed together in a known manner and, if required, fixed on the hollow shaped body 34. If the shaped component bodies 31, 32 and 33 have a segmental height on both sides which is less than at some point in between, as shown in FIGS. 3 and 4, then they are seated immovably and firmly in the described manner, just as in FIG. 3.

Figure 5A:
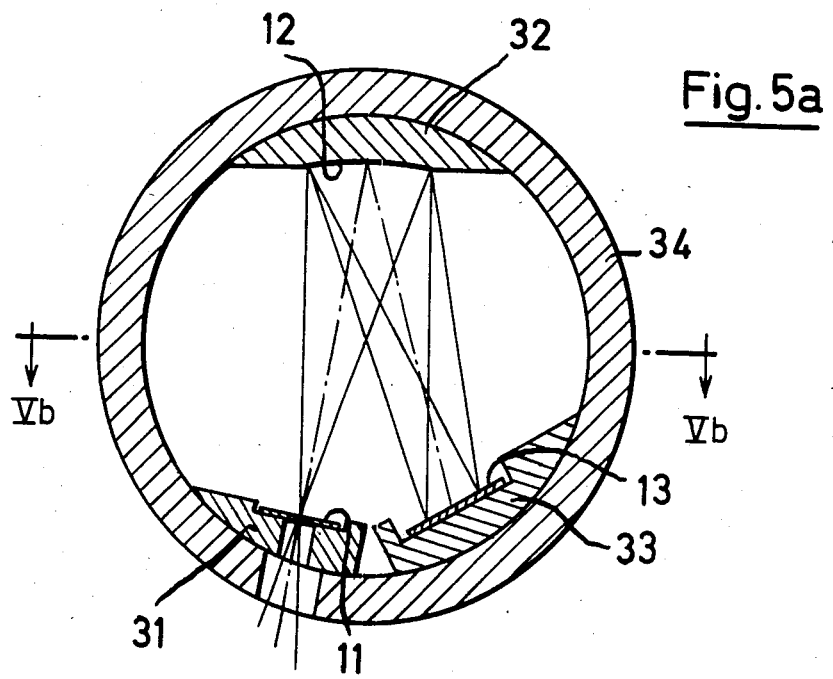
FIG. 5a is a section view taken along line Va—Va of FIG. 5b and shows a fourth embodiment of the invention for a spectrometer.
Figure 5B:
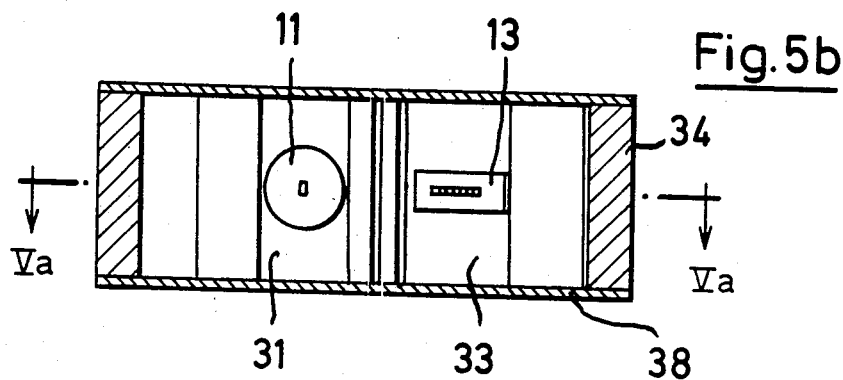
FIG. 5b is a section view taken along line Vb—Vb of the embodiment of FIG. 5a; and, FIG. 5c is an exploded perspective view of the embodiment of FIGS. 5a and 5b.
Figure 5C:
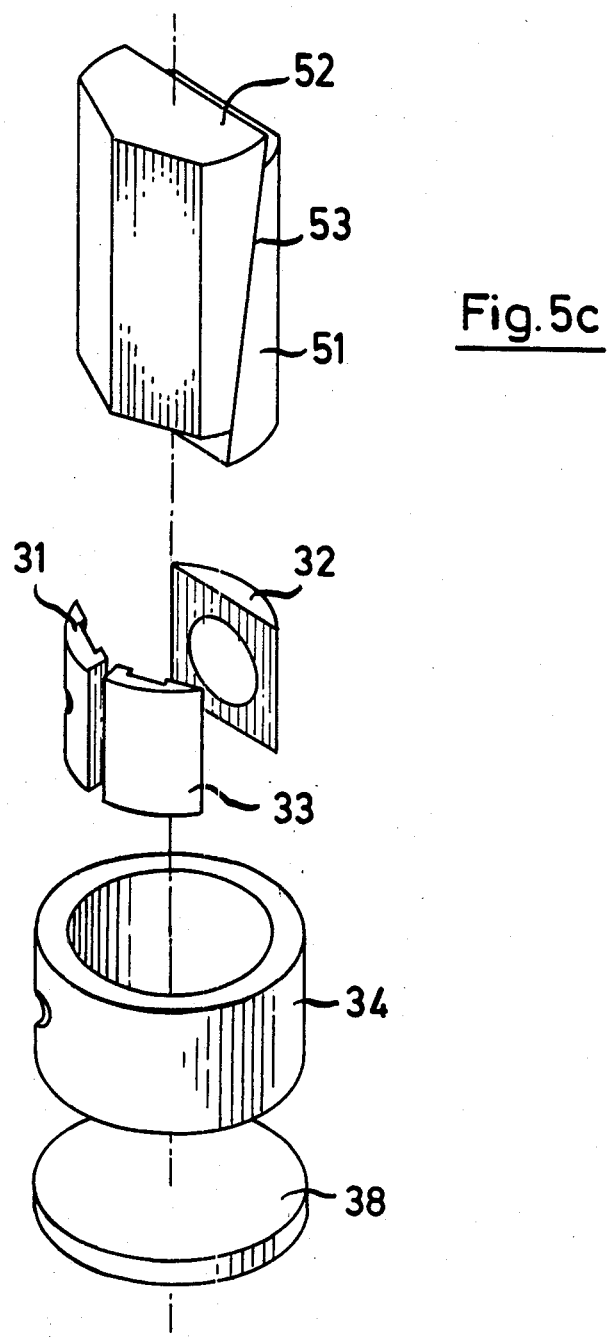

FIG. 5 shows a particularly advantageous embodiment, in which the shaped component bodies are placed in the exactly correct location relative to one another by means of shaped adjusting bodies. This is shown in the exploded view of FIG. 5c. The shaped component bodies are again identified as 31, 32 and 33, and the cylindrical hollow shaped body is again 34. At least during the adjustment operation for the shaped component bodies, the hollow shaped body 34 is seated upon the bottom plate 38. Then, the shaped component bodies 31, 32 and 33 are inserted into the hollow shaped body 34, approximately at the correct locations. Subsequently, first the shaped adjusting body 51 and finally the shaped adjusting body 52 are inserted into the hollow shaped body 34. The two shaped adjusting bodies 51, 52 have corresponding wedge surfaces 53, on which they can be made to slide relative to one another. The second shaped adjusting body 52 is therefore pushed as far downward as possible after its insertion. As a result, the three shaped component bodies gain the exactly correct location relative to one another. In this embodiment, the optical components 11, 12 and 13 must be mounted so as to be recessed in the shaped component bodies 31, 32 and 33.

The fixation of the shaped component bodies on the hollow shaped body can be performed for instance by the joining methods disclosed in published German patent application DE-OS No. 32 11 867 referred to above. It is also possible to provide small canals, or small plane surfaces, extending from top to bottom on the cylindrical surfaces of the shaped component bodies. Then an adhesive, which assures a permanent bond after hardening, can be introduced into the resultant gaps formed between the hollow shaped body and the shaped component bodies; these gaps can be configured such that they do not affect proper contact between contacting surfaces. A suitable adhesive for this purpose is available in the Federal Republic of Germany from the Loctite company under the designation IS 420. After the shaped component bodies have been fixed to the hollow shaped body, the shaped adjusting bodies are removed again.

In the exemplary embodiments of FIGS. 1 to 4, the standard kind of assembly is adequate. The cohesion of the shaped parts can be effected in a known manner by pressing them together in the direction of the axis 16, or by applying other known joining techniques.

In order that the optical components will assume the exactly correct location as a result of pressing the shaped bodies together, they must be adjusted exactly beforehand with respect to the surfaces that are critical for assembly, or they must be produced on the shaped component bodies with an accurate location and alignment. In the case of the slit 11, the receiver 13 and the light-conducting fibers (21, 23), the required accuracy of adjustment is such that measuring microscopes known for use in making an adjustment are sufficient.

It is suitable to provide the free opening of the slit in a thin metal sheet and then to adjust this sheet on the shaped component body. Then, the sheet can be fixed in a known manner, for instance by means of a few drops of a suitable adhesive on its edge. The receiver 13, for instance a diode cell, is then adjusted and fixed on the corresponding shaped component body in the same manner.

In spectrometers, the radiation that is to be tested is often supplied through a light-conducting fiber; in multiplexers and demultiplexers for fiber-optic communications, the radiation is supplied and carried away via light-conducting fibers. Securing and adjusting the light-conducting fibers is then suitably performed as follows: One or more bores having a suitable diameter are etched into an etchable glass plate (21a or 23a in FIG. 2) after appropriate exposure to light. Such a glass can be made of FOTURAN, a product of the Schott company of the Federal Republic of Germany. The light-conducting fibers are cemented into these bores, and then their ends are ground down flush with the glass plate; the glass plate attains its desired thickness in this operation. Finally, the glass plate and the light-conducting fiber 21 or the light-conducting fibers 23 are adjusted and fixed on the shaped component body, for example 25, under a measuring microscope.

For the concave grating, adjustment using a measuring microscope is inadequate in many applications, because in these cases a very accurate alignment is required. In these instances, a method can be used which exploits the fact that smaller tolerances, and lower costs, arise when holographic concave grating originals are produced than when copies are made. The surface of a shaped component body that is intended to receive the concave grating can be produced as a spherical surface with the required accuracy using known techniques. This also applies to the orientation of this spherical surface relative to the other surfaces, which are critical for the assembly with the other shaped bodies.

Next, the photoelectric layer required for producing the grating is applied, using known techniques, to the spherical surface provided for the concave grating. This photoelectric layer is exposed to light in an apparatus functionally identical to that for which the concave grating is subsequently used. In this apparatus, only the slit—if it is not circular and has the correct diameter—is replaced with a circular diaphragm, for instance 5 μm in diameter. The receiver is also replaced by a circular diaphragm at a location that is determined by calculation. The exact location is arrived at by an optimizing calculation for the particular use of the spectrometer.

The two circular diaphragms are used as source points for the production of the holographic grating, which is performed in a known manner. In this way, a grating which has exactly the correct location and alignment is produced on the shaped component body.

As materials for the shaped bodies, any materials which can be machined or produced with sufficient accuracy, such as metal, plastics, glass or ceramic, in particular high-density ceramic, can be considered. Ceramic, glass and plastics have the advantage of not requiring protection against corrosion. Glass and ceramic make it possible to attain surface qualities that are unattainable with metal. Plastics, as injection-molded or high-pressure die-cast parts, are suitable for large quantity applications, as long as maximum accuracy is not necessary.

It is suitable to give the individual shaped bodies shapes such that they can be relatively economically produced with high accuracy in the critical dimensions. This is particularly true for the hollow shaped body 34 and the cylindrical-segment shaped component bodies 31, 32 and 33; however, it applies to the shaped bodies shown in the other drawing figures as well.

The invention described herein is suitable both for the production of individual optical apparatus and for large-scale production.

It is understood that the foregoing description is that of the preferred embodiments of the invention and that various changes and modifications may be made thereto without departing from the spirit and scope of the invention as defined in the appended claims.

What is claimed is:

1. A method for the adjusted assembly of the optical components of an optical apparatus, the method comprising the steps of:
    adjusting and permanently fixing the optical components onto selected ones of a plurality of shaped component bodies; and,
    then assembling and fixing said shaped component bodies in a defined manner.

2. The method of claim 1, comprising assembling and fixing said shaped component bodies with at least one shaped spacer body.

3. The method of claim 1, wherein the step of assembling and fixing said shaped component bodies includes the step of inserting the latter into a shaped hollow body so as to cause each one of said shaped component bodies to be placed into respective predetermined positions.

4. The method of claim 3, wherein the step of inserting said shaped component bodies into said hollow shaped body includes the step of also inserting at least one shaped spacer body.

5. The method of claim 1, wherein the step of assembling and fixing said shaped component bodies includes the steps of:
    inserting said shaped component bodies into a shaped hollow body so that said bodies are approximately at their respective desired positions within said hollow body;
    inserting shaped adjusting body means into said hollow body for displacing said shaped component bodies into their predetermined final positions relative to each other;
    fixing said shaped component bodies in said final positions; and,
    withdrawing said shaped adjusting body means.

6. The method of assembling the optical components of an optical apparatus comprising the steps of:

placing the optical components on selected ones of a plurality of shaped component bodies each having predetermined contact engaging faces so as to cause the optical component on a shaped component body to be precisely located and aligned with respect to said faces thereof;

then assembling said shaped component bodies so as to cause selected pairs of said contact engaging faces to be in mutual engaging contact thereby establishing a predefined assembled arrangement of said shaped component bodies; and, fixing said shaped component bodies so as to retain the same in said predefined assembled arrangement.

7. The method of claim 6, at least one of said optical components being placed on one of said shaped component bodies by being produced directly thereon.

8. The method of claim 7, wherein the optical apparatus includes an inlet slit and a receiver defining a plane and wherein said one optical component is a holographic grating arranged on said one shaped component body under the exact same geometric conditions to the inlet slit and to the plane of said receiver as will occur in said optical apparatus after the latter is assembled, said holographic grating being formed by using approximately the location of said inlet slit or a location conjugated with respect to the latter as a first source point for the formation of said grating and using a suitable point in said plane of said receiver as a second source point for the formation of said grating.

9. The method of claim 6, at least one of said optical components being placed on one of said shaped component bodies by adjusting and permanently fixing said one optical component so as to cause the latter to be precisely located and aligned with respect to the contact engaging faces of said one component.

10. An optical apparatus comprising:

a plurality of shaped component bodies form-tightly assembled in a dimensionally precise arrangement to each other, each of said shaped component bodies having predetermined contact engaging faces for defining the form-tight assembly; and, a plurality of optical components placed on selected ones of said shaped component bodies before the assembly thereof so as to cause each one of said optical components to be precisely located and aligned with respect to the contact engaging faces of the shaped component body corresponding thereto.

11. The optical apparatus of claim 10, comprising a shaped hollow body for insertably accommodating said shaped component bodies in a form-tight configuration therein.

12. The optical apparatus of claim 11, comprising at least one shaped spacer body as part of said form-tight configuration.

13. The optical apparatus of claim 10, comprising: a shaped hollow body for insertably accommodating said shaped component bodies at approximately their respective desired positions therein; and, shaped adjusting body means insertable into said hollow body for displacing said shaped component bodies into their predetermined form-tight final positions relative to each other.

14. The optical apparatus of claim 13, said shaped adjusting body means including two wedge-shaped bodies conjointly defining an inclined interface along which one of said wedge-shaped bodies is movable relative to the other one of said wedge-shaped bodies for effecting the displacement of said shaped component bodies into said final positions.

15. The optical apparatus of claim 10, one of said optical components including a glass plate having a bore formed therein and being adjustable with respect to the edges of the shaped component body corresponding thereto, a light-conducting fiber being connected into said apparatus with the aid of said glass plate and being cemented into said bore, the free surface of said glass plate facing away from the shaped component body corresponding thereto and the end of said light-conducting fiber being polished so as to be flush.

16. The optical apparatus of claim 10, said shaped component bodies being made of a material selected from the group consisting of metal, plastic, glass, ceramic and compressed ceramic.

* * * * *